(12) United States Patent
Ostberg (10) Patent No.: US 8,474,896 B2
(45) Date of Patent: Jul. 2, 2013

(54) VEHCILE TOPPER THAT ENCLOSES THE CARGO BED OF A VEHICLE SUCH AS A PICKUP TRUCK, YET PROVIDES CONVENIENT OPEN ACCESS THERETO

(76) Inventor: Murray Ostberg, Stromsburg, NE (US)

( * ) Notice: Subject to any disclaimer, the term of this patent is extended or adjusted under 35 U.S.C. 154(b) by 139 days.

(21) Appl. No.: 13/089,608

(22) Filed: Apr. 19, 2011

(65) Prior Publication Data

US 2012/0267913 A1    Oct. 25, 2012

(51) Int. Cl.
  *B60R 9/06*    (2006.01)
(52) U.S. Cl.
  USPC .............. 296/37.6; 296/100.02; 296/100.05
(58) Field of Classification Search
  USPC .............. 296/158, 168, 37.6, 100.02, 100.03,
       296/100.04, 100.05, 98, 100.12, 146.8, 156;
       224/146.8, 156, 403, 404
  See application file for complete search history.

(56) References Cited

U.S. PATENT DOCUMENTS

| | | | |
|---|---|---|---|
| 1,950,927 A * | 3/1934 | McMillan ................... | 296/181.4 |
| D141,085 S * | 5/1945 | Powers ........................ | D12/96 |
| 3,500,895 A | 3/1970 | Silvernail | |
| 3,649,073 A | 3/1972 | Whittemore | |
| 3,806,187 A * | 4/1974 | Bull ........................ | 296/100.09 |
| 3,942,830 A | 3/1976 | Woodard | |
| 3,986,749 A | 10/1976 | Hull et al. | |
| 4,138,154 A | 2/1979 | McKeon | |
| 4,252,362 A | 2/1981 | Campbell | |
| 4,335,916 A | 6/1982 | Gutgsell | |
| 4,511,173 A | 4/1985 | Wentzel | |
| 4,518,194 A | 5/1985 | Kirkham et al. | |
| 4,563,034 A | 1/1986 | Lamb | |
| 4,659,136 A | 4/1987 | Martin et al. | |
| 4,717,196 A | 1/1988 | Adams | |
| 4,784,427 A * | 11/1988 | Burgess ........................ | 296/98 |
| 4,784,429 A | 11/1988 | Hodges | |
| 4,786,099 A * | 11/1988 | Mount ........................ | 296/98 |
| 4,789,196 A | 12/1988 | Fields | |
| 4,795,206 A | 1/1989 | Adams | |
| 4,889,381 A | 12/1989 | Tamblyn et al. | |
| 4,932,717 A | 6/1990 | Swann | |
| 5,040,843 A * | 8/1991 | Russell et al. ................ | 296/98 |
| 5,186,514 A | 2/1993 | Ronai | |
| 5,251,950 A | 10/1993 | Bernardo | |
| 5,516,182 A | 5/1996 | Aragon et al. | |

(Continued)

FOREIGN PATENT DOCUMENTS

| WO | 2007130062 A1 | 11/2007 |
|---|---|---|
| WO | 2009089604 A1 | 7/2009 |

*Primary Examiner* — Jason S Morrow
(74) *Attorney, Agent, or Firm* — Russ Weinzimmer & Associates P.C.

(57) ABSTRACT

A vehicle topper provides an enclosed compartment when coupled with a cargo bed of a vehicle such as a pickup truck. Convenient open access is provided to the bed of the vehicle by employing a rolling door that is supported by a frame within two parallel guide tracks. When the rolling door is in a completely closed position, the vehicle topper creates an enclosed and lockable compartment in conjunction with the cargo bed and the vehicle's cargo box. When the rolling door is moved through the guide tracks to a completely open position, the door is substantially disposed within a sub-floor space between a floor supported by the frame of the vehicle topper, and the vehicle's cargo bed. The rolling door can be caused to bypass the completely closed position and to open in a reverse direction. An outer frame is included to secure the vehicle topper to the walls of the cargo box.

20 Claims, 10 Drawing Sheets

U.S. PATENT DOCUMENTS

| | | |
|---|---|---|
| 5,531,497 A | 7/1996 | Cheng |
| 5,897,154 A * | 4/1999 | Albertini et al. ............. 296/37.6 |
| 6,000,745 A | 12/1999 | Alexa |
| 6,113,176 A | 9/2000 | Bernardo |
| 6,244,651 B1 | 6/2001 | Hecock, Jr. |
| D444,763 S | 7/2001 | Draine |
| 6,276,735 B1 * | 8/2001 | Champion ................... 296/37.6 |
| 6,494,519 B2 * | 12/2002 | Sturgin et al. ................... 296/50 |
| 6,505,875 B1 | 1/2003 | Laper |
| 6,568,732 B2 | 5/2003 | De Gaillard |
| 6,725,807 B1 | 4/2004 | Tapia |
| 6,767,043 B1 | 7/2004 | Sanseviero |
| 7,188,888 B2 | 3/2007 | Wheatley et al. |
| 7,404,586 B2 | 7/2008 | Seiberling |
| 7,438,342 B2 | 10/2008 | Greenwood |
| 8,075,035 B1 * | 12/2011 | Sullivan ...................... 296/24.4 |
| 8,201,871 B1 * | 6/2012 | Rydberg .................... 296/186.2 |
| 2002/0135199 A1 | 9/2002 | Hanning |
| 2005/0023314 A1 | 2/2005 | Williams et al. |
| 2006/0192406 A1 * | 8/2006 | Seiberling ........................ 296/98 |
| 2007/0267887 A1 | 11/2007 | Seiberling |
| 2008/0129067 A1 | 6/2008 | Rios |
| 2009/0273209 A1 | 11/2009 | Joab |
| 2012/0267057 A1 * | 10/2012 | Rydberg ........................ 160/113 |

* cited by examiner

VEHCILE TOPPER THAT ENCLOSES THE CARGO BED OF A VEHICLE SUCH AS A PICKUP TRUCK, YET PROVIDES CONVENIENT OPEN ACCESS THERETO

FIELD OF THE INVENTION

This invention relates generally to vehicle cargo beds, and more specifically to toppers that enclose vehicle cargo beds.

BACKGROUND OF THE INVENTION

Vehicles such as pickup trucks are equipped with a cargo bed and typically an open cargo box formed by walls extending vertically from the bed. The primary purpose of the pickup truck bed and the open cargo box formed therewith is to carry general payload items for transport. While the open pickup cargo box provides easy and convenient access to the bed for loading and unloading payload items, a number of pickup truck bed enclosures have been designed to cover the bed of the open cargo box of pickup trucks. The purpose of these designs is to form an enclosed and lockable compartment in conjunction with the cargo box and its bed. Motivations for employing cargo box enclosures include, but are not limited to, securing personal and payload items against theft, as well as preventing exposure of such items to the elements.

One common vehicle cargo bed enclosure is known as a "tonneau cover". Tonneau covers are typically made of vinyl, fiberglass or aluminum, are flat and fit flush with the top of the vertical wall members that extend up from the bed of a vehicle such as a pickup truck, thereby defining the cargo box. Retractable tonneau covers are designed to provide easy access to the vehicle bed for loading and unloading. With respect to one such design, the tonneau cover deploys from, and then rolls back up into a canister, much like a window shade. The canister is commonly installed at the cab end of the cargo box, and the tonneau cover is deployed from the canister toward the tailgate end of the cargo box. Other tonneau cover designs retract by either folding or tilting.

While tonneau covers can provide a secure and lockable compartment that also facilitates easy access to the cargo bed from above, one major downside to the retractable tonneau cover is that it cannot be employed to cover payload items that extend in height much above the top of the walls of the cargo box. Another is that even in its refracted state, a tonneau cover can take up a significant portion of the cargo space. The canister design discussed above takes up the same space, whether refracted or not.

A topper is another commonly employed design for enclosing the otherwise open bed of a vehicle such as a pickup truck. The main structure of a topper is typically made of fiberglass or aluminum and typically mounts atop the walls extending vertically from the vehicle bed to form the cargo box. Toppers typically cover the entire cargo box to provide a secure and lockable compartment. One advantage of the vehicle topper over the tonneau cover is that it can accommodate payloads that extend vertically well above the top of the vehicle's cargo box. The height of some topper designs can even extend vertically above the top of the vehicle's passenger cab.

One disadvantage of the vehicle topper, however, is that loading and unloading large and/or bulky items can be made difficult. Access to the enclosed cargo compartment created by the topper is typically limited to a door at the tailgate end of the cargo box, or possibly through window/panel openings formed in the sides of the topper. Thus, many items that would have been more easily loaded into an open vehicle bed from above, must now be slid into the compartment through the rear door or the side openings. Even if the payload item(s) can be loaded through the back door or through the side openings, the person loading the vehicle is often required to crawl into the compartment on their hands and knees to adjust the enclosed load, as topper's are not typically configured with sufficient vertical clearance for someone to stand upright while inside the compartment.

Another disadvantage of known vehicle toppers is that even with an extended height advantage over known tonneau covers, they will not accommodate all payloads that might otherwise be encountered by a vehicle that has no vehicle topper installed. When such items cannot be accommodated by the topper, or cannot be easily loaded with the topper in place, the topper must be completely removed to accommodate such a payload Even if a. topper could be configured to include a removable roof, such configurations would be inconvenient to open and close. Moreover, such configurations would necessarily appropriate a significant amount of the storage space formed between the topper and the cargo box just to store the removed roof.

SUMMARY OF THE INVENTION

A vehicle topper of the invention employs a rolling door supported by a door frame within two parallel guide tracks. When the door is in a completely closed position, the vehicle topper creates an enclosed and lockable compartment in conjunction with a cargo bed of a vehicle such as a pick-up truck. When the rolling door is moved through the tracks to a completely open position, the door is substantially disposed within a sub-floor space between a floor supported by the frame and the bed of the vehicle's cargo box. This leaves the cargo bed open and conveniently accessible from above, as it there was no vehicle topper installed. As a result, payload items can be loaded into the cargo bed without the inconvenience caused by a permanent roof, which is characteristic of prior art vehicle toppers. Moreover, the rolling door can be caused to bypass the completely closed position and to open in a reverse direction. This is desirable to allow debris that may have accumulated on the top surface of the rolling door to be deposited outside the cargo bed prior to the door traveling into the sub-floor space Doing this avoids depositing the debris within the sub-floor space.

In accordance with various embodiments of the invention, a vehicle topper creates an enclosed compartment when coupled with a vehicle cargo bed, while also providing convenient open access to the vehicle cargo bed. The vehicle topper includes a rolling door frame that has a base supporting two sides, a front end and a back end. Each of the two sides of the rolling door frame supports a guide track. In one embodiment, the guide tracks are rectangular with rounded corners and parallel with one another. In another aspect of the invention, each of the guide tracks is continuous between a starting point and an ending point.

The vehicle topper further includes a floor covering at least an area defined by the base of the rolling door frame. The floor is supported by the base of the door frame and is able to form a sub-floor space between the floor and the vehicle bed when the vehicle topper is coupled to a vehicle bed. A portion of each of the two guide tracks runs under the floor and through the sub-floor space.

The vehicle topper further includes a rolling door having two side edges, a leading edge and a trailing edge. Each of the two side edges has a plurality of guiding means attached thereto between the leading edge and the side edge. The guiding means attached to each side edge of the rolling door are disposed in a different one of the guide tracks. The guiding means are for slideably supporting the door within the guide tracks between a completely closed position, where the leading edge of the rolling door is located at the starting point of each of the guide tracks, and a completely open position where the trailing edge of the rolling door is at the ending point of each of the guide tracks. At least a portion of the rolling door is disposed under the floor and within the subfloor space when the rolling door is placed in the completely open position.

In another embodiment, each of the guide tracks also includes a diverter that permits the rolling door to bypass the fully closed position and travel 360 degrees around the guide tracks. In further embodiments, the diverter includes a discontinuity in each of the guide tracks located just before the rolling door reaches the starting points at the fully closed position, and a diverter extension that extends each of the guide tracks beyond their ending point. The guiding means attached to each side of the leading edge of the rolling door can be moved through the discontinuity of the guide tracks to bypass the fully closed position and into the diverter extensions of the guide tracks.

In additional embodiments, each of the guide tracks includes a locking mechanism that engages the rolling door when the rolling door is placed in the fully open position and when the rolling door is placed in the fully closed position, thereby preventing the rolling door from moving within the guide tracks until the locking mechanism is released.

In another embodiment, the rolling door is moved between the fully open and the fully closed positions using an electric motor-driven mechanism.

In other embodiments, the rolling door also includes a manual actuating means coupled to the leading edge of the rolling door for applying manual force to the rolling move it between the fully closed position and the fully open position. door to In another aspect of the invention, the floor is capable of supporting factory load requirements specified for the vehicle bed.

In another embodiment, the floor is extended vertically up the back end of the rolling door frame to protect the guide tracks and the rolling door from shifting loads.

In other embodiments of the invention, the rolling door frame is made of an extruded material. In further embodiments, the rolling door frame is made of extruded aluminum and the guiding means are bearings.

In other aspects of the invention, the cargo box includes lateral walls extending vertically from the vehicle bed, and the invention includes an outer frame having two sides and an end. Each of the two sides is coupled to one of the sides of the rolling door frame and each of the two sides of the outer frame is capable of being supported by one of the lateral walls of the vehicle. The end is coupled to the back end of the rolling door frame and between the two sides of the outer frame. The end is capable of being supported by an end wall of the cargo box located at the cab end of the vehicle bed. Moreover, each side and the end of the outer frame can be coupled to one of the lateral walls and the end wall respectively using tie down elements of the vehicle and support side windows.

In some embodiments, the rolling door is segmented to allow the rolling door to flexibly move through the guide tracks.

BRIEF DESCRIPTION OF THE DRAWINGS

Applicant's invention will be more fully understood with reference to the Detailed Description set forth below, in conjunction with the following figures, wherein.

DETAILED DESCRIPTION OF THE INVENTION

Figure 1A:
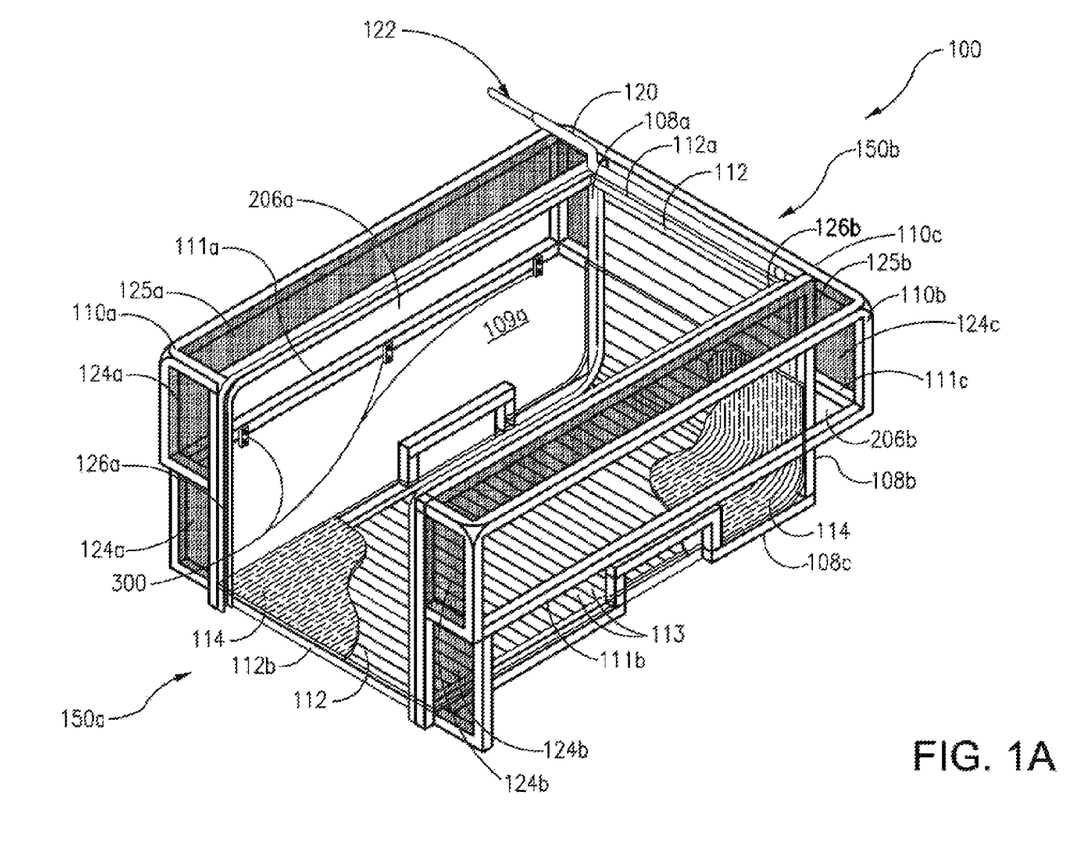
FIG. 1A is a perspective view of an embodiment of the invention as it would be coupled to a vehicle cargo bed and cargo box such as that of a pickup truck, but without the vehicle for clarity and with its rolling door being illustrated in a fully open position.

FIG. 1A illustrates a perspective view of an embodiment 100 of the vehicle topper invention with its rolling door 112 in a completely open position. A vehicle to which the embodiment of the invention would be typically coupled is left out of this view for purposes of clarity. It should be noted that while embodiments of Applicant's invention are primarily illustrated with application to pickup trucks, Applicant's invention is intended to be used in conjunction with any vehicle that has a cargo bed, regardless of whether that vehicle is referred to as a pickup truck, or by some other name.

The embodiment of the invention 100 has a door frame referred to generally as 108, which has a front end 150a, back end 150b, and sides 108a and 108b. The two sides 108a and 108b are supported by the base 108c. Sides 108a and 108b, together with base 108*c*, form two rectangular and vertically oriented planes 109*a* (FIG. 1A) and 109*b* (FIG. 1B) that are substantially parallel with one another. Each of the sides 108*a* and 108*b*, in conjunction with base 108*c*, support a pair of guide tracks generally referred to as 126(only one of the tracks 126*a* can be seen in the view of FIG. 1A) within their respective vertical planes 109*a*, 109*b*. The base 108*c* of door frame 108 also supports a floor 114 that is only partially shown in FIG. 1A for clarity. In some embodiments, the floor 114 covers at least the entire area defined by the base 108, and in some embodiments the floor also extends vertically up from the base 108*c* and at least partly up the back end 150*b* of the door frame 108. It should be noted that the back end 150*b* of the invention corresponds to the front or cab end of the vehicle bed when installed as intended.

In an embodiment, the two guide tracks 126*a*, *b* have a starting point that is at or very near the base 108*c* and at the front end 150*a* of the door frame 108. Each of the guide tracks 126*a*, *b* extend continuously along the members forming their respective sides 108*a* and 108*b* of rolling door frame 108, back along the base 108*c* and to an endpoint that is at or near the starting point. The location of the starting and ending points of the two tracks will be more readily illustrated with reference to FIG. 2 below. Both guide tracks 126*a*, *b* are disposed within the parallel vertical planes formed by their respective sides 108*a*, 108*b* and the base 108*c* of door frame 108.

In the embodiment disclosed in FIG. 1A, the two guide tracks 126*a*, *b* are substantially rectangular in shape, due to the rectangular nature of the two sides 108*a* and 108*b* of the door frame 108. However, three of the corners of the tracks 126*a*, *b* are curved as illustrated. The corners of the tracks 126 located at the front end 150*a* of the base 108*c* are not continuously rounded, as will be discussed in more detail below.

The two guide tracks 126*a*, *b*, in conjunction with the door frame 108, support a rolling door 112. The rolling door has a leading edge 112*a* and a trailing edge 112*b*, and is retained by and supported within the two tracks 126 by a plurality of guiding means (not shown) that are attached along the side edges of the door between the leading edge 112*a* and the trailing edge 112*b*. The guiding means can be bearings, wheels or any other structure known to those of skill in the art to serve the purpose of retaining and guiding the movement of a sliding or rolling door within a guide track. For example, rolling doors are well-known to those of skill in the art as employed for structures such as garages, sheds and the like. Further, it is well known that such doors can also slide without need for bearings or wheels if the door is not too heavy or if the door is attached to a chain or other filament disposed in the track which is pulled or pushed within the track. Any of the known mechanisms for retaining and guiding a slideable or rolling door within guide tracks for such an application should be considered a functional equivalent of the guiding means.

In an embodiment, the rolling door 112 can be constructed of metal such as aluminum, or from other suitable materials. In other embodiments, rolling door 112 can be segmented as illustrated by segments 113, with at least one guiding means coupled to each side edge of the segment 113. The guiding means, together with the curved corners of the otherwise rectangular track, facilitate smooth and continuous movement of the rolling door 112 between the starting and ending points of the guide tracks 126*a*, *b*. In other embodiments, the rolling door 112 can be made to be flexible enough to follow the curved corners of the guide tracks 126*a*, *b* without requiring that the rolling door 112 be segmented.

As can be seen from the embodiment of the invention 100 illustrated in FIG. 1A, those portions of the two guide tracks 126*a*, *b* that span the door frame 108 where the door frame base 108*c* is supporting the floor 114, run below the floor 114. As will be illustrated in drawings below that illustrate the invention as it is intended to be coupled to a vehicle to cover its cargo bed, the floor 114 is designed to provide a sub-floor space between the floor 114 and the cargo bed of the vehicle. As the rolling door 112 is actuated upwardly to be opened, the trailing edge 112*a* of the rolling door 112 will be guided by the guide tracks 126*a*, *b* and the guiding means to a position that is under the floor 114 and within the sub-floor space created by the floor 114 and the vehicle bed.

In an embodiment, the invention 100 also includes an outer frame generally coupled referred to as 110. The outer frame has two sides 110*a* and 110*b*, each formed with or to sides 108*a* and 108*b* of door frame 108 respectively. In an embodiment, the outer frame can also have an end 110*c* that extends between sides 108*a* and 108*b*, and can be coupled to the back end 150*b* of the rolling door frame 108. Members 111*a* and 111*b* are designed to be supported by the top edges of the lateral walls of a vehicle cargo box. Member 111*c* is designed to be supported by an end wall of the cargo box extending vertically upward from the bed at the cab end of the vehicle.

In some embodiments, coupling means (300, FIG. 1A) can be used to couple the members 111*a*, 111*b* and 111*c* to the cargo box using tie down elements that are commonly provided as part of the vehicle design. This will be illustrated in more detail below with reference to FIG. 3. Each side 110*a*, 110*b* and end 110*c* of outer frame 110 supports additional end panels 124*a*, *b* and *c* respectively, roof panels 125*a* and *b*, as well as side panels 206*a* and *b*, all designed to seal the enclosed compartment from the outside. Any of these panels can be solid, opaque or windows. Window/panels 206*a*, *b* can be hinged to provide access to the enclosed compartment there-through, such as for access to tool boxes or other items stored close to the outside of the cargo box.

The outer frame 110 serves a number of functions, including to enclose the lockable compartment including the cargo bed, along with the rolling door frame 108, tracks 126 and floor 114, from the outside elements. It also serves to provide lateral support for the vehicle topper 100 of the invention and presents an aesthetically pleasing exterior in conjunction with the vehicle to which it is coupled.

To accommodate vehicle cargo beds and boxes of virtually any dimension, the door frame 108 as well as outside frame 110 can be manufactured of an extruded material, such as extruded aluminum, so that the members that define the door frame and outer frame can be manufactured more easily to a required length. Of course, those of skill in the art will recognize the door frame 108 as well as outside frame 110 can be manufactured of any appropriate material, whether extruded or not, so long as the two frames are able to properly perform their respective functions.

In some embodiments of the invention, a manual actuating means 120 is attached to the leading edge 112*a* of rolling door 112 for manually moving the door between its completely closed and completely open positions. In one embodiment, the actuating means is a handlebar 120 that includes a telescoping or recessing handle 122 that can be recessed away within handlebar 120 so that it does not protrude while not in use. Those of skill in the art will recognize that other structures will be functional equivalents to the handlebar 120 and handle 122 for manually actuating or moving the door between its completely open and completely closed positions. For example, ropes can be attached to the leading edge and the trailing edge of the rolling door to manually pull the door at each end. A bar with a hook or other gripping mechanism can also be equivalently employed to latch or grab onto either the leading or trailing edge of the door to push or pull it.

As is well-illustrated by FIG. 1A, when the rolling door 112 is in its completely open position, the rolling door 112 is stowed conveniently under the floor 114, and the vehicle cargo bed will be completely open and accessible from above. This permits a user to load payload items into the cargo box, without any interference from the topper itself, unlike prior art truck toppers as discussed above.

Figure 1B:
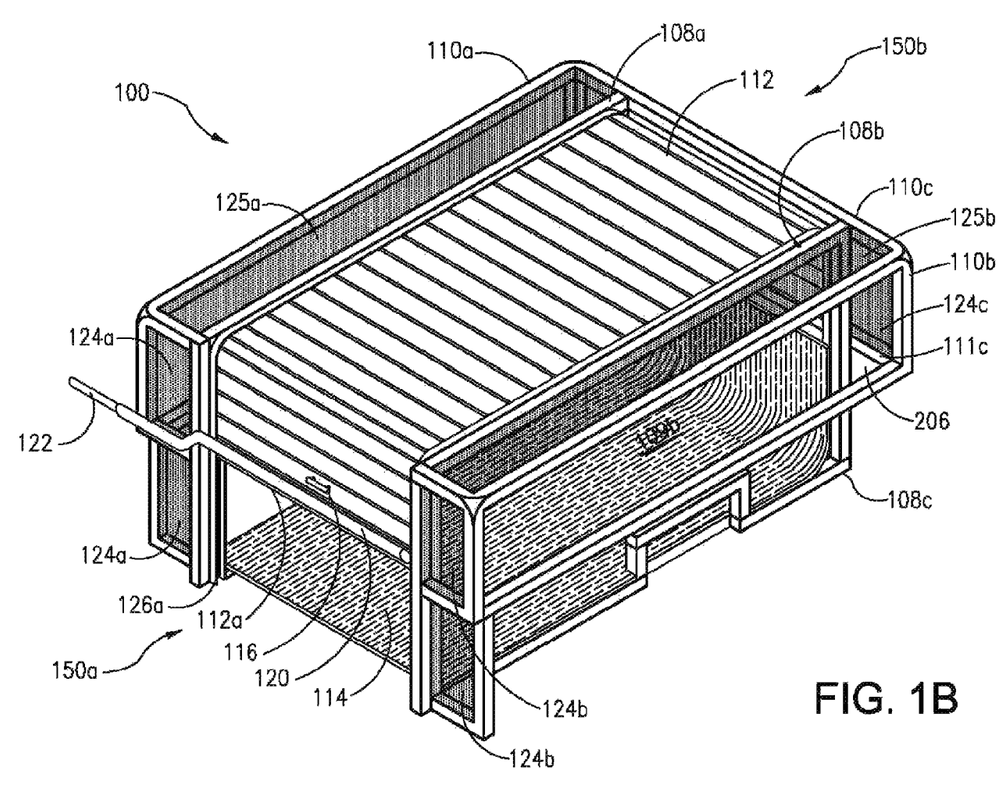
FIG. 1B is a perspective view of an embodiment of the invention as it would be coupled to a vehicle cargo bed and cargo box, but without the vehicle for clarity and with its rolling door being illustrated in a position between the fully open and fully closed positions.

FIG. 1B illustrates the embodiment of the invention 100 of FIG. 1A, where the rolling door is just short of its completely closed position. All of the features of the embodiment 100 discussed with respect to FIG. 1A are similarly numbered. The rolling door is left partially open to illustrate the relationship of the rolling door 112 to the interior compartment (104, FIG. 5B) that will be formed by the invention 100 when coupled to the cargo box and bed of a vehicle.

Unlike in FIG. 1A, the rolling door 112 is no longer beneath the floor 114 and is close to being in its completely closed position, which will complete the creation of a lockable and sealed compartment for any payload items stored therein. Those of skill in the art will recognize that any number of known techniques can be used to lock the rolling door to limit access to the compartment once the leading edge 112a of the rolling door 112 is in contact with the vehicle bed. Handle 116 is included to allow a user to partially open and close the door for simple partial access without requiring use of the actuating means 120.

It should also be noted that while some precipitation such as rain that falls onto the top of the rolling door 112 may flow into the vehicle bed behind the door frame 108 where the rolling door 112 curves around curved upper corners of the track 126 (not shown) at the back end 150b of the invention 100, the precipitation will be able to flow under the floor 114 and out of the front end 150a of the invention 100, which is located at the rear of the vehicle bed. In another embodiment, those of skill in the art will recognize that a diverter or guard can be installed to prevent most of the precipitation from entering the vehicle bed at that location.

Figure 2:
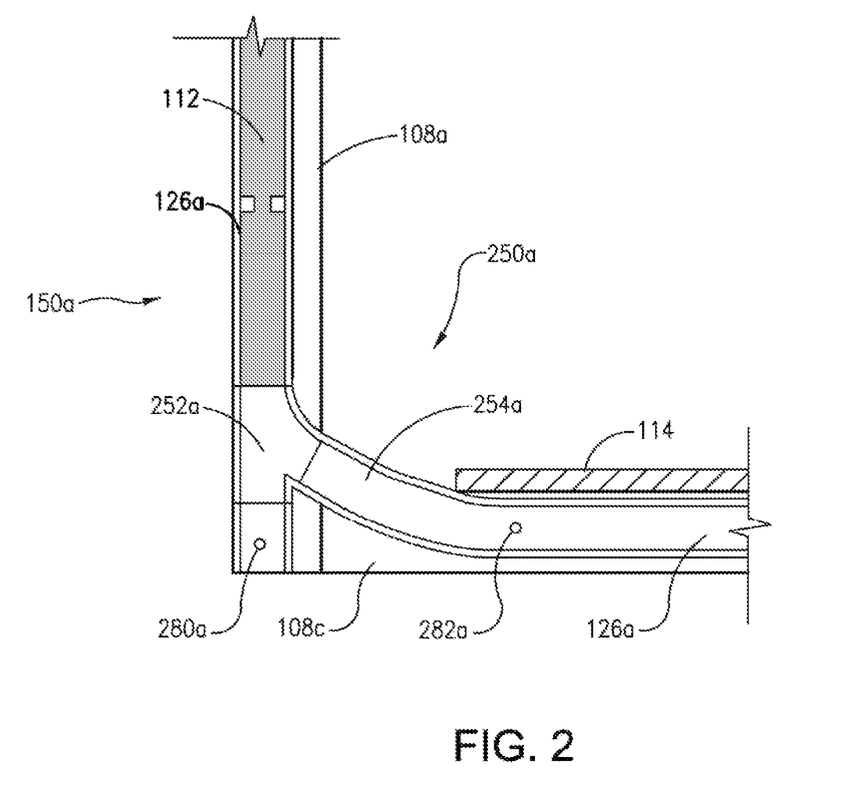
FIG. 2 is a close-up side view of a portion of an embodiment of one of the continuous tracks of the invention, illustrating the starting and ending points of each of the continuous tracks, and a diverter structure that can facilitate a 360 degree rotation of the rolling door.

FIG. 2 is an illustration of the one 126a of the tracks 126a, b that is supported by the side 108a of the door frame 108. The view is at the front 150a of the embodiment 100 near the base 108c. Floor 114 is shown as a cross-section to reveal the portion of the track 126a that is supported by the base 108c. Those of skill in the art will understand that the following discussion applies to both tracks 126a, b on both sides 108a, b of the door frame 108, even though only one is shown in FIG. 2 for ease of illustration.

In an embodiment, holes 280a, b define the starting points of tracks 126a, b and holes 282a, b define the ending points of tracks 126a, b respectively. Holes 280a, b and 282a, b are capable of receiving a retractable pin (not shown) located on both side edges of the rolling door 112 (not shown) at or near the leading 112a and trailing 112b edges of the rolling door 112 respectively. When the leading edge 112a of the rolling door 112 is at or very near the holes 280a, b denoting the starting point of tracks 126a, b, the rolling door 112 is in the completely closed position and the pins located on each of the side edges of the rolling door 112 at its leading edge 112a can be caused to extend into the holes 280a, b to restrain the rolling door 112 from freely moving in the tracks 126a, b. Likewise, when the trailing edge 112b of the rolling door 112 is at or near the holes 282a, b defining the ending point of tracks 126a, b, the rolling door 112 is in the completely open position and the pins located on each of the side edges of the rolling door 112 at its trailing edge 112b can be caused to extend into the holes 282a, b to restrain the rolling door 112 from freely moving in the tracks 126a, b. Restraining the rolling door 112 in either the completely open or completely closed positions is particularity important while the vehicle is motion.

Those of skill in the art will recognize that in some embodiments, the retractable pins can be spring-loaded and will automatically extend into the holes 280a, b and 282a, b as they pass over them. A mechanism can then be manually actuated to retract the pins from the holes 280a, b and 282a, b when it is desired to move the door again within the tracks 126. In other embodiments, the pins can be manually extended into the holes 280a, b and 282a, b as well as manually retracted therefrom when the rolling door 112 is to be moved. In another embodiment, the rolling door 112 is actuated within the tracks 126a, b by an electric motor, much like an automatic garage door opener/closer mechanism as is known in the art. In this case, the rolling door 112 will be held in place at starting 280a, b and ending points 282a, b of tracks 126a, b by the mechanism that is driven by the electric motor, but can be released from the mechanism to be actuated manually, as is well-known. In an embodiment, the electric motor is powered by the vehicle's electrical system.

Also illustrated in FIG. 2 is the fact that this corner of the rectangular shaped track is not continuously rounded as are the corners of the tracks 126a, b. Discontinuities 252a,b serve to permit the rolling door 112 to be extended downward to reach the bed of the truck in a substantially perpendicular orientation to achieve a completely closed position. It will be clear that if these discontinuities 252a, b in the tracks 126 were not provided, the leading edge of the rolling door 112 would be curving as it reached the cargo bed of the truck, and would not make proper contact for purposes of closing off the compartment. Ending points 282a, b permit the door 112 to be locked into the completely open position rather than continuing around the corner.

Diverters 250a, b however, are designed to permit the bypassing of discontinuities 252a, b in the tracks 126a, b just prior to reaching the fully closed position at the starting points 280a, b. This is accomplished with an extension 254a, b of the tracks 126a, b that extend beyond the the ending points 282a, b of tracks 126a, b. When actuating the rolling door 112 manually, if the operator presses the leading edge 112a of the rolling door 112 inwardly against the inside of walls of tracks 126a and b, the guiding means attached to the side edges of the rolling door 112 at the leading edge 112a of the rolling door 112 can be directed through discontinuities 252a, b and into the extension portions 254a, b of tracks 126a, b. In this way, the door 112 can be caused to travel the tracks 126a, b into the completely open position, but in the opposite direction of normal operation. Moreover, the rolling door 112 can eventually travel over a full three-hundred and sixty degree cycle around the guide tracks and back to the fully closed position.

This capability can be of enormous benefit when, for example, the rolling door 112 has been in a fully closed position for an extended period of time and has accumulated debris or precipitation on its top surface. By opening the rolling door 112 in this reverse direction, the debris has an opportunity to be cleared from the top surface of the rolling door 112, either by gravity or manually, as the top surface of door 112 becomes vertical and then upside down, prior to traveling into the sub-floor space below the floor 114. Otherwise, if the rolling door 112 is opened in the normal upward and forward direction, the debris or precipitation would eventually be deposited into the sub-floor space as the top surface of the rolling door becomes upside down inside the sub-floor space. It will be understood that when operating the rolling door 112 in the bypass mode described above, the pins at the leading edge 112a of the rolling door 112 will first lock the door in the completely open position in holes 282a, b. They will then have to be retracted to complete the cycle and close the door 112 while continuing in the same direction.

Figure 3A:
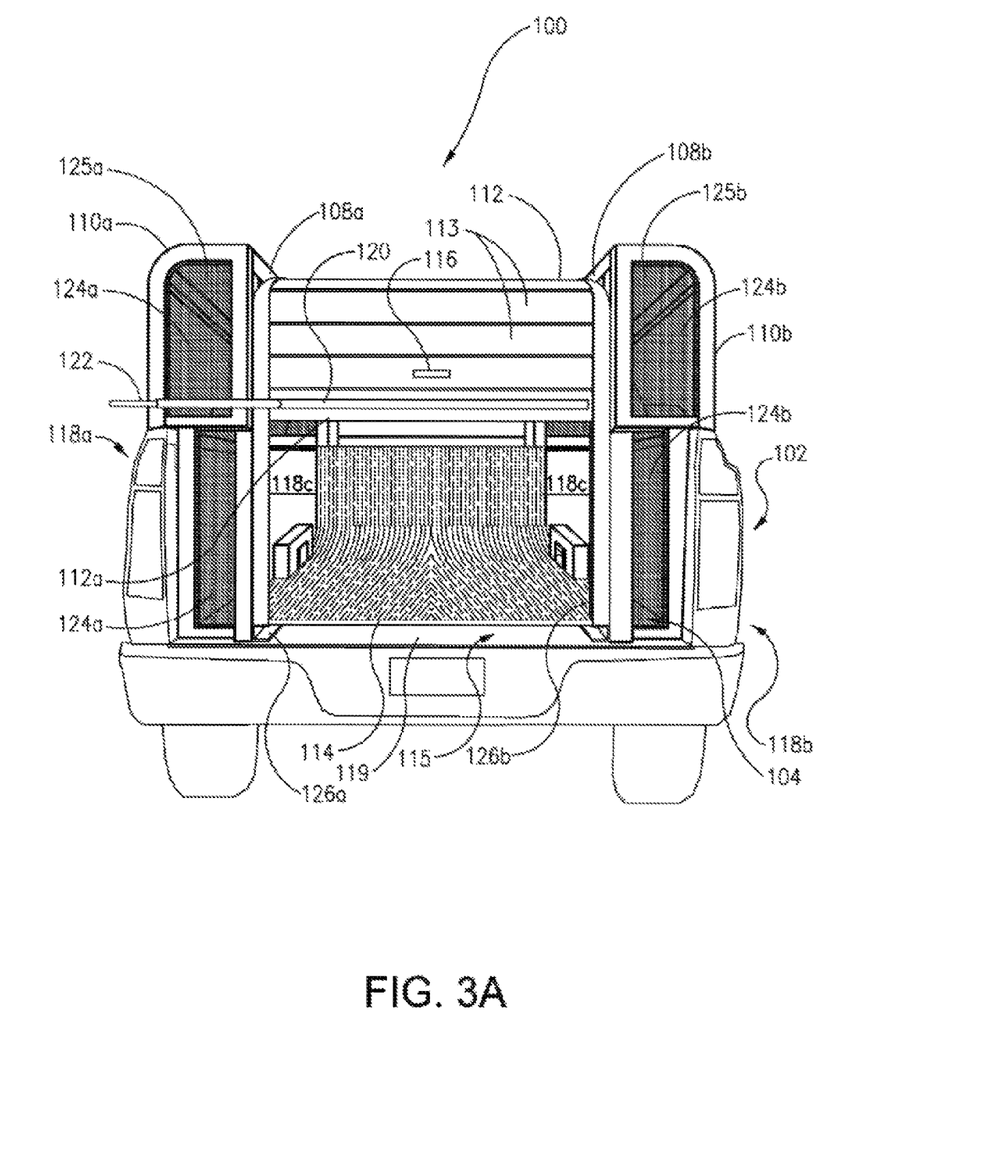
FIG. 3A is a rear view of an embodiment of the invention coupled to a vehicle cargo bed and cargo box with its rolling door between the fully open and fully closed positions.

FIG. 3A illustrates a rear view of an embodiment of the vehicle topper 100 as installed on a pickup truck 102. All of the features of the embodiment 100 discussed with respect to FIGS. 1A and 1B are similarly numbered. In FIG. 3A, rolling door 112 is partly open and between its completely open and completely closed positions. A partial view is provided of the compartment 104 created by the vehicle topper of the invention 100 and the cargo box of pickup truck 102. The cargo box of pickup truck is largely defined by pickup bed 119 and vertical walls 118a and 118b of pickup truck 102. The base 108a of rolling door frame 108 rests upon, and can be secured to, the bed 119 by any known technique. Floor 114 is elevated from the bed 119 and supported by base 108c of rolling door frame 108 to create sub-floor space 115. In the embodiment illustrated in FIG. 3A, the diverter 250 of FIG. 2 is not shown for simplicity.

Outside frame sides 110a, 110b rest atop the vertical walls 118a, 118b, and can be secured thereto by any known technique, including being coupled to tie down elements that are commonly provided on the inside surface of vertical walls 118a, 118b. Outside frame end 110c rests atop the vertical end wall 118c (not shown), and can be secured thereto by any known technique, including being coupled to tie down elements that are commonly provided on the inside surface of vertical end wall 118c. One such embodiment will be discussed in more detail below with reference to FIG. 4.

Figure 3B:
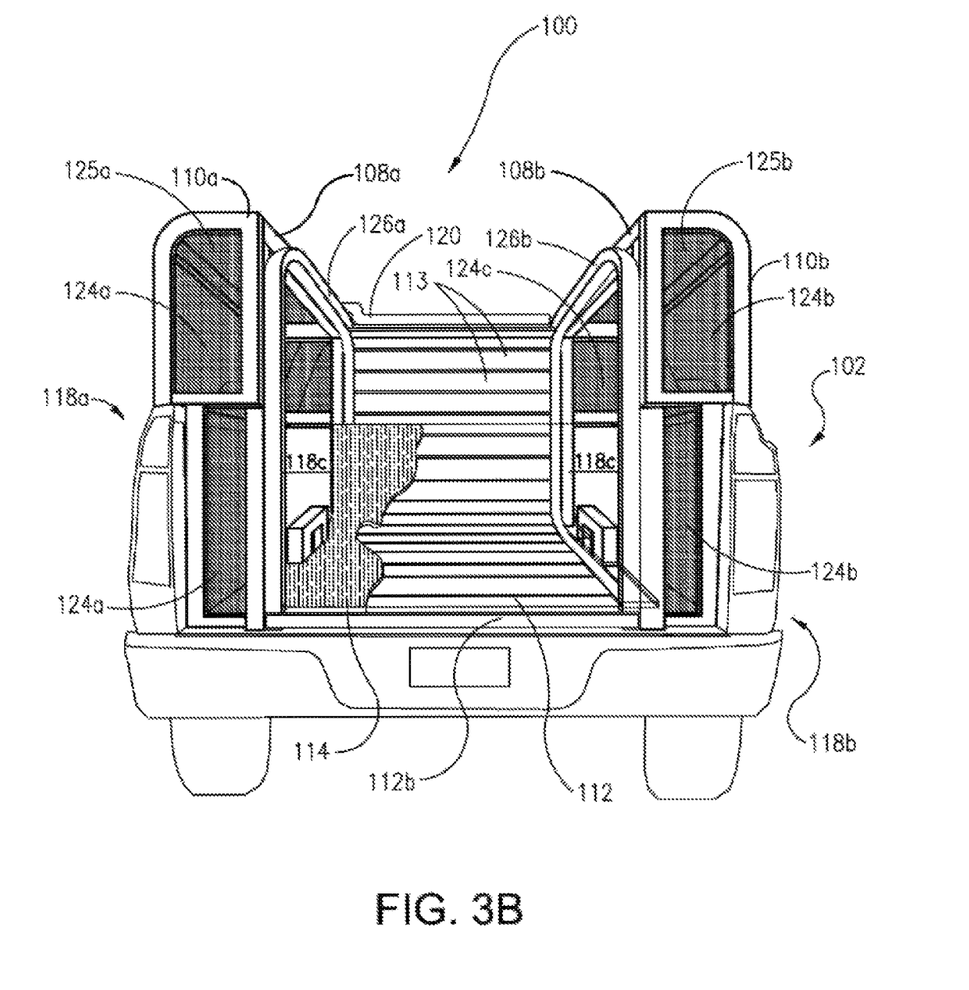
FIG. 3B is a rear view of an embodiment of the invention coupled to a vehicle cargo bed and cargo box, with its rolling door in a fully open position.

FIG. 3B illustrates a rear view of an embodiment of the vehicle topper 100 as installed on a pickup truck 102. All of the features of the embodiment 100 discussed with respect to FIGS. 1A, 1B and 3A are similarly numbered. In FIG. 3B, rolling door 112 is in its completely open position. Trailing edge 112b of rolling door 112 is at the ending point of tracks 126a, b. The cargo box is completely accessible from above as if there is no vehicle topper 100 because of the location of the rolling door 112 being behind and under the floor 114 when in the completely open position. Floor 114 is shown extended up the back end 150b of the rolling door frame 108. This serves to protect rolling door 112 and tracks 126a, b from payload items that might shift toward the front of the pickup cargo box. In some embodiments, floor 114 can be extended all of the way to the top of the back end 150b of the door frame 108.

It should be noted that while panels 124a, b and c and 125a, b are shown in the various views with transparent fill to provide an internal view beyond the panels for purposes of illustration, in various embodiments of the invention, they can be transparent, translucent, or opaque and are intended to seal the compartment from the external environment.

Figure 4:
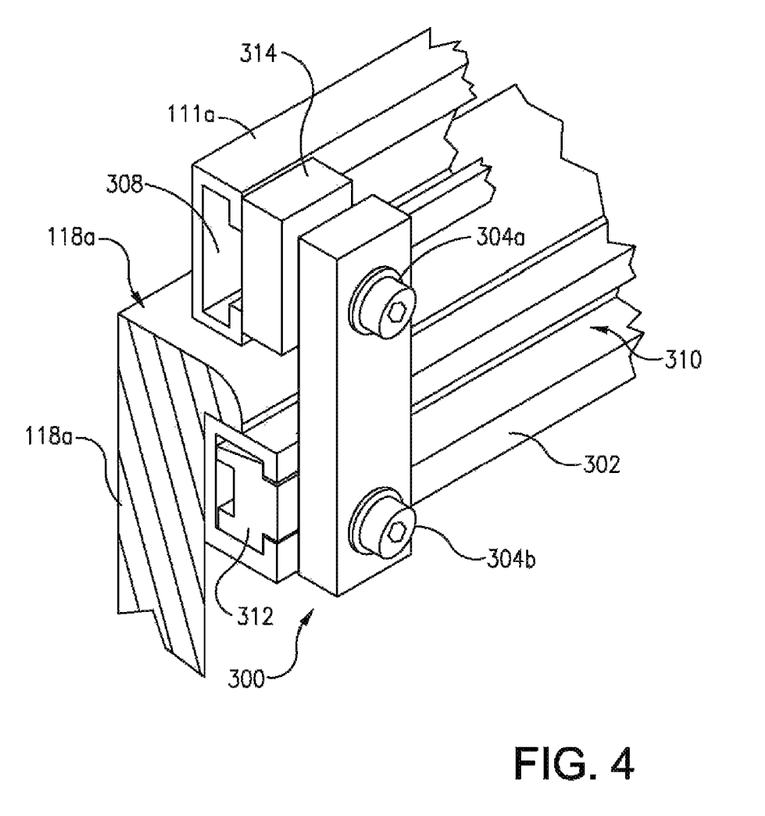
FIG. 4 is a perspective view of an attachment means by which an embodiment of the invention can be secured to the walls of a vehicle cargo box.

FIG. 4 illustrates an abbreviated close-up view of an embodiment of a clamping means 300 that can be used in conjunction with elements commonly provided in vehicles with cargo boxes to tie down and secure payload items for transport. These elements, such as tie down points, are commonly used in conjunction with rope or string to facilitate pulling the rope or strong taught across the payload item(s), particularly when those items are transported in an open cargo box and thereby creating a risk that the payload items might be blown or otherwise dislodged from the cargo box during transport.

FIG. 4 shows a portion of member 111a of outside frame side 110a that supports the embodiment 100 of the invention as it rests upon the top of vertical wall 118a of pickup truck 102 as illustrated in FIGS. 3A and 3B. Clamping means 300 is secured to outside frame member 111a using bolt 304a through stand-off block 314 and a retaining member disposed in channel 308 of member 111a. Clamping means 300 is further secured to tie down rail 302, which is formed or attached to the interior of vertical wall 118a, using bolt 304b through retaining member 312 disposed in channel 310 of tie down rail 302. Those of skill in the art will recognize that there are many other suitable methods of securing the various embodiments of the invention to the cargo bed and cargo box of a vehicle. For example, members 111a, b and c can be bolted straight to the tops of the vertical walls 118a, b and c forming the cargo box, with the clamping means being a simple nut and bolt.

Figure 5A:
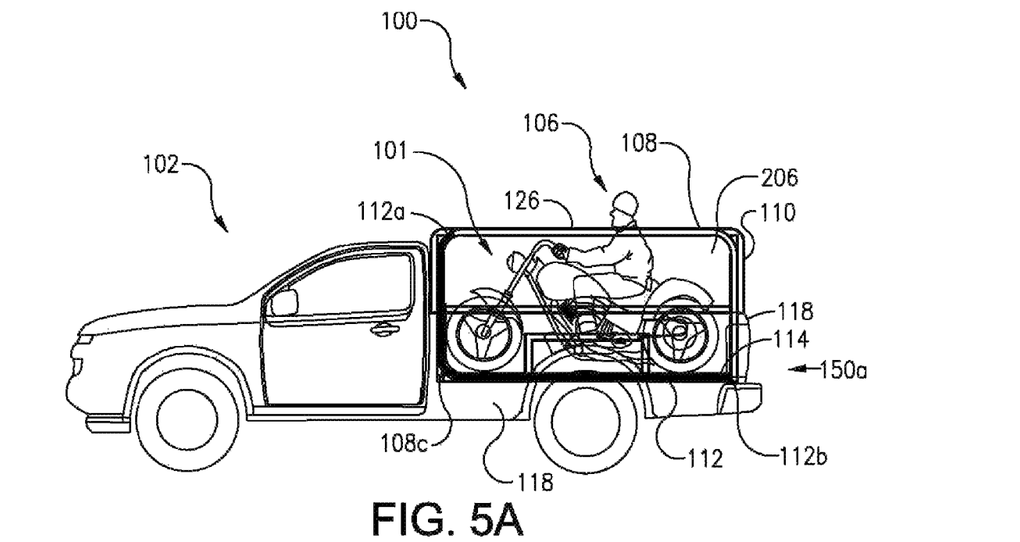
FIG. 5A is a side view showing an embodiment of the invention coupled to the cargo bed and cargo box of a pickup truck after a user has driven a motor bike into a payload position with the rolling door in a fully open position.

FIG. 5A illustrates a side view of an embodiment of the invention 100 installed with a cargo box of a pickup truck 102, with the rolling door 112 in the completely open position (i.e. trailing edge 112b of rolling door 112 is at the ending point (280, FIG. 2) of tracks 126a at the front end 150a of the rolling door frame 108, and the leading edge 112a is located at the top of the back end 150b of frame 108). A user 106 has just ridden motorcycle 101 up a ramp (not shown) and into the the cargo box formed therewith, as would be common for loading such a vehicle as a payload item for transport.

As can be seen, the benefit of Applicant's invention over prior art vehicle toppers is that this can be accomplished notwithstanding that the rider's head is above the top of the vehicle topper of the invention 100. This cannot be safely accomplished with prior art vehicle toppers as they have fixed roofs. Rolling door 112 is conveniently rolled under floor 114, freeing the cargo bed to be loaded as if there is no topper. Floor 114 is designed to handle any load that would otherwise be acceptable under the specifications for the vehicle bed itself, and thus can be made from any material suitable for achieving that design goal.

Figure 5B:
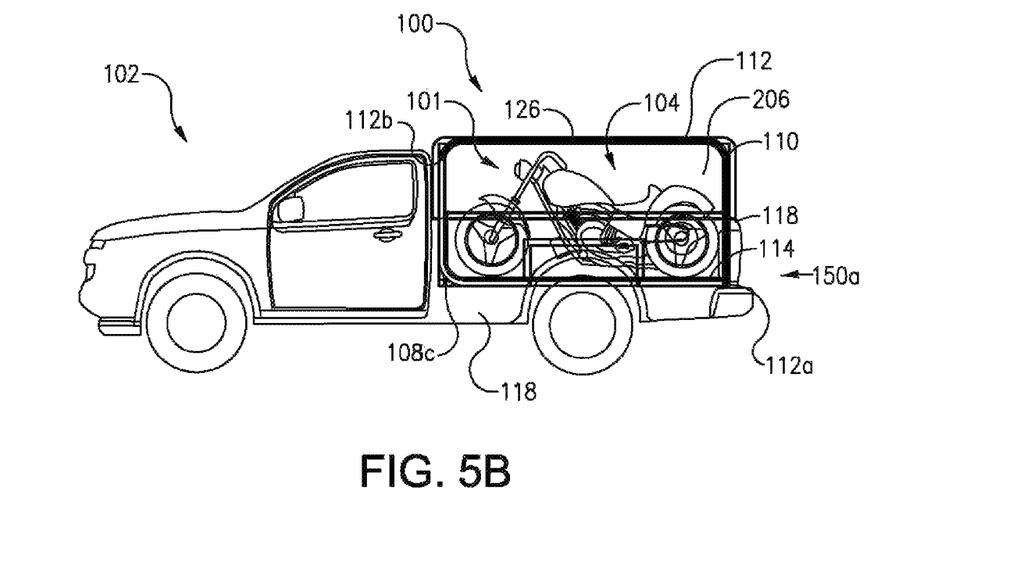
FIG. 5B is a side view showing an embodiment of the invention coupled to the cargo bed and cargo box of the pickup truck of FIG. 5A, with the motor bike now secured within the cargo space formed between the cargo box and the embodiment of the invention, with the rolling door in a fully closed position.

FIG. 5B illustrates a side view of the embodiment of the invention 100 of FIG. 5A installed with a cargo bed and box of a pickup truck 102. The rolling door 112 is now in the completely closed position (i.e. leading edge 112a is located at the starting point (282, FIG. 2) of tracks 126 at the front end 150a of door frame 108, and the trailing edge 112b is at the top of the back end 150b of frame 108), forming a lockable compartment 104 by which motorcycle 101 is now secure for transport.

Figure 6A:
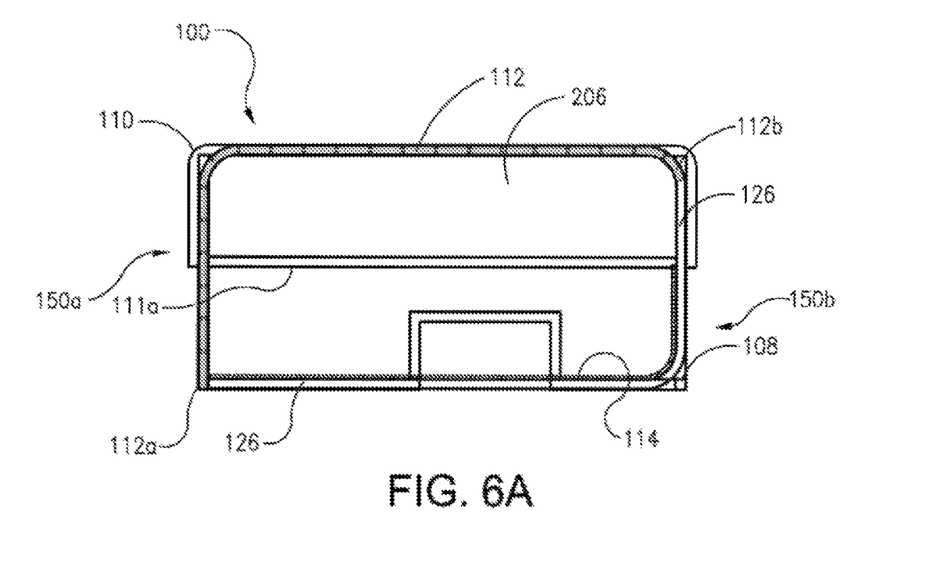
FIG. 6A is a side view of an embodiment of the invention with the rolling door in a fully closed position.
Figure 6B:
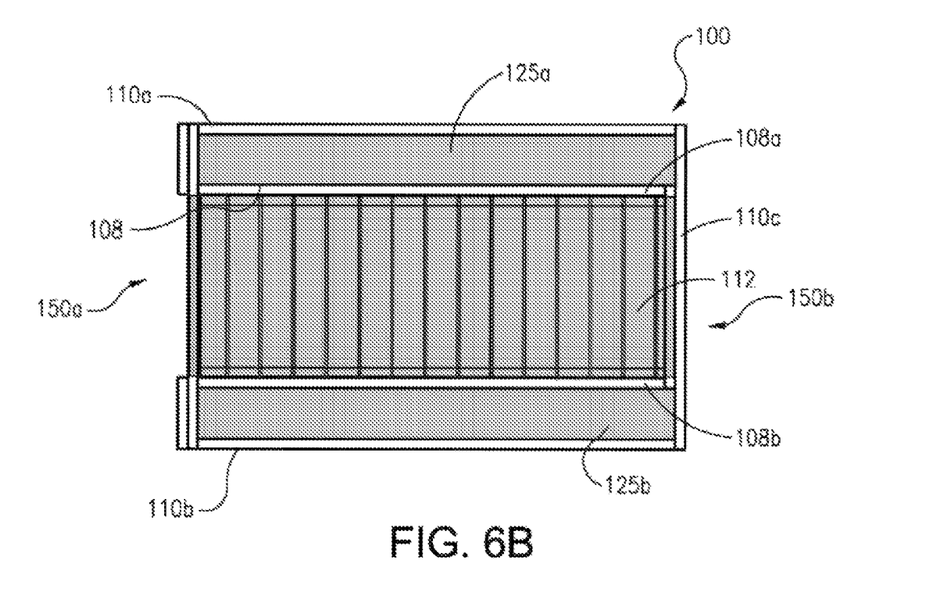
FIG. 6B is a top view of an embodiment of the invention with the rolling door in a fully closed position.

FIG. 6A and FIG. 6B illustrate a side and top view respectively of an embodiment of the invention 100 without a vehicle for simplicity. FIG. 6A and FIG. 6B show the rolling door 112 in the completely closed position.

Figure 7A:
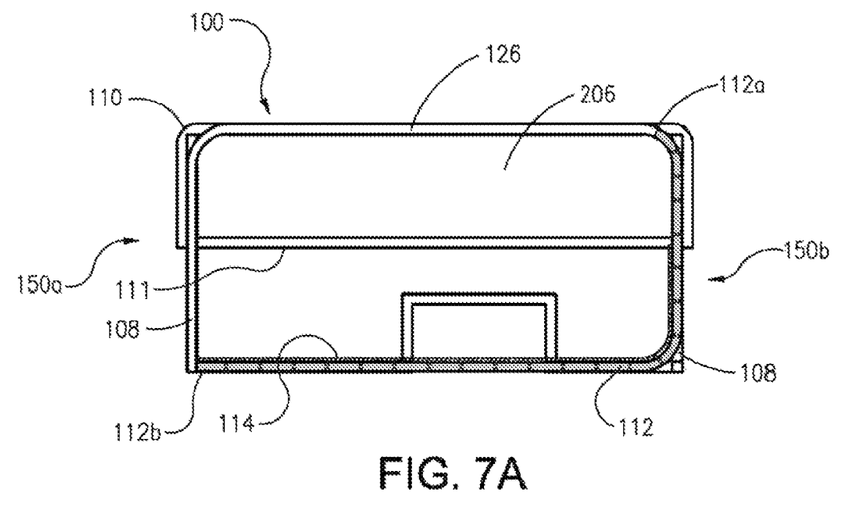
FIG. 7A is a side view of an embodiment of the invention with the rolling door in a fully open position.
Figure 7B:
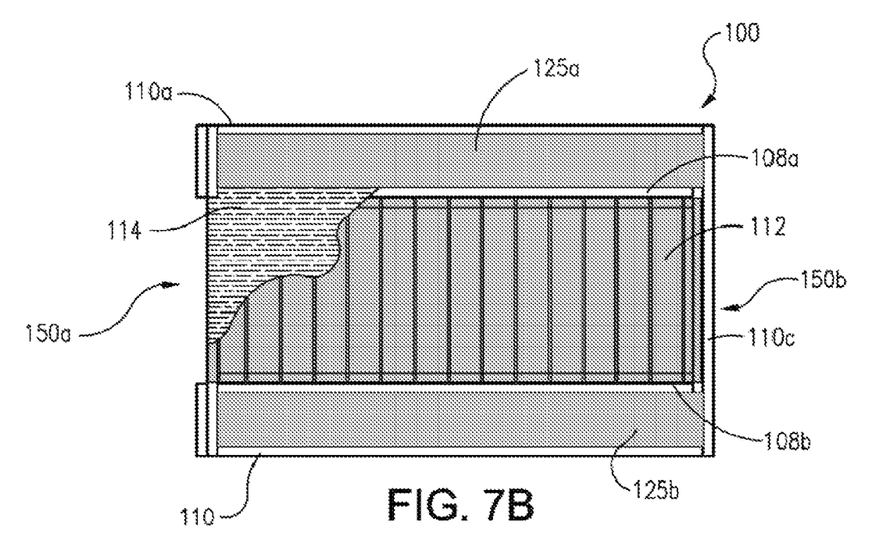
FIG. 7B is a top view of an embodiment of the invention with the rolling door in a fully open position.

FIG. 7A and FIG. 7B illustrate a side and top view respectively of an embodiment of the invention 100 without a vehicle for simplicity. FIG. 7A and FIG. 7B show the rolling door 112 in the completely open position and under floor 114.

Figure 8A:
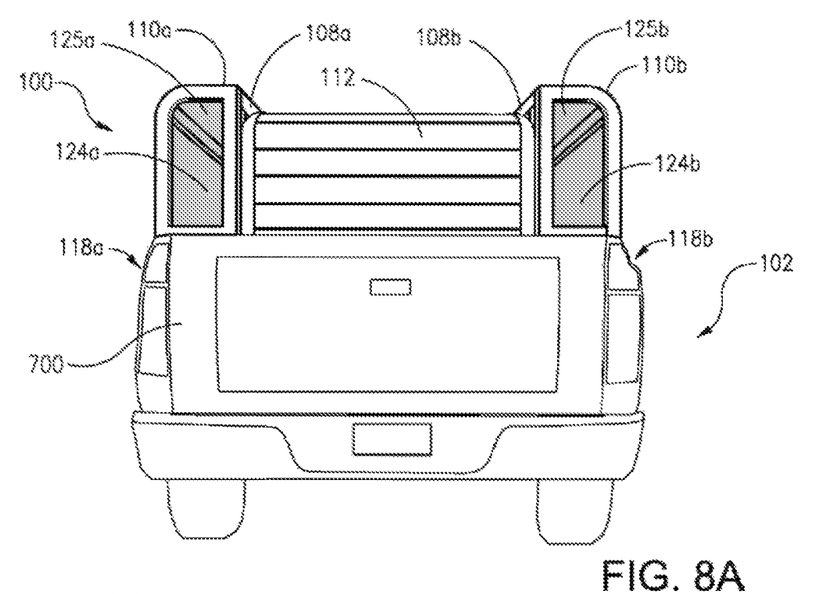
FIG. 8A is a rear view of an embodiment of the invention as installed on the cargo bed and cargo box of a pickup truck with the tailgate of the vehicle closed and the rolling door of the invention in a fully closed position.
Figure 8B:
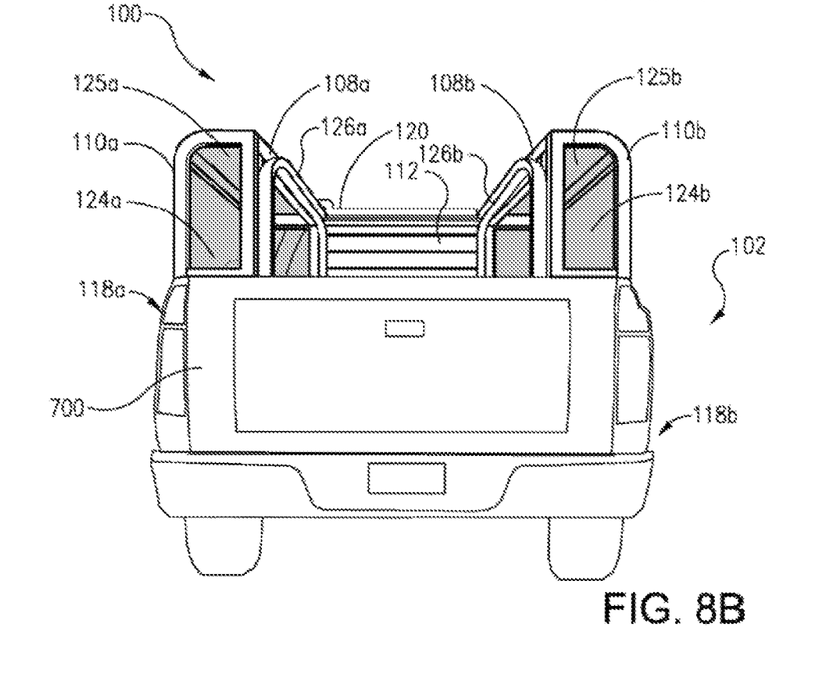
FIG. 8B is a rear view of an embodiment of the invention as installed on the cargo bed and cargo box of a pickup truck with the tailgate of the vehicle closed and the rolling door of the invention in a fully open position.

FIG. 8A and FIG. 8B illustrate an embodiment of the invention coupled to the cargo box of a vehicle in the form of pickup truck 102 where the tailgate 700 is left installed and is closed. FIG. 8A shows the rolling door 112 in the completely closed position. FIG. 8B shows the rolling door 112 in the completely open position.

It should also be noted that some vehicles can have a bed but no cargo box, such as in the case of a flatbed truck or trailer. Those of skill in the art will recognize that this is just a special case of a cargo box with no vertically extending walls, and that the present invention can be easily adapted to this case by simply extending and securing the outer frame sides 110a, b and end 110c to the flatbed directly. Moreover, in some embodiments, it may be advantageous to deploy an embodiment of the invention without the external frame 110 if the rolling door frame can be properly secured to the vehicle bed without need for the function provided by the external frame 110. In such an embodiment, the outside of the rolling door frame 108 can be sealed with panels to provide the enclosed compartment.

Other modifications and implementations will occur to those skilled in the art without departing from the spirit and the scope of the invention as claimed. Accordingly, the above description is not intended to limit the invention except as indicated in the following claims.

What is claimed is:

1. A vehicle topper that creates an enclosed compartment when coupled with a vehicle bed, the vehicle topper capable of providing convenient open access to the vehicle bed, the vehicle topper comprising:
    a rolling door frame, the rolling door frame having a base supporting two sides, a front end and a back end, each of the two sides of the rolling door frame supporting a guide track, each of the guide tracks having a starting point and an ending point;
    a floor covering at least an area defined by the base of the rolling door frame, the floor being supported by the base and able to form a sub-floor space between the floor and the vehicle bed when the vehicle topper is coupled to a vehicle bed, and wherein a portion of each of the two guide tracks runs under the floor and through the sub-floor space; and
    a rolling door having two side edges, a leading edge and a trailing edge, each of the two side edges having a plurality of guiding means attached thereto between the leading edge and the side edge, the guiding means attached to each side edge of the rolling door being disposed in a different one of the guide tracks, the guiding means for slideably supporting the door within the guide tracks between a completely closed position where the leading edge of the rolling door is located at the starting point of each of the guide tracks, and a completely open position where the trailing edge of the rolling door is at the ending point of each of the guide tracks; and wherein at least a portion of the rolling door is disposed under the floor and within the sub-floor space when the rolling door is placed in the completely open position.

2. The vehicle topper of claim 1 wherein each of the guide tracks further includes a diverter that permits the rolling door to bypass the fully closed position and travel 360 degrees around the guide tracks.

3. The vehicle topper of claim 2 wherein the diverter comprises:
    a discontinuity in each of the guide tracks located just before the rolling door reaches the starting points of the guide tracks at the fully closed position;
    a diverter extension that extends each of the guide tracks beyond their ending points; and
    wherein the guiding means attached to each side of the leading edge of the rolling door can be moved through the discontinuity of the guide tracks and into the diverter extensions of the guide tracks, thereby bypassing the fully closed position of the rolling door.

4. The vehicle topper of claim 3 wherein each of the guide tracks includes a restraining mechanism that engages the rolling door when the rolling door is placed in the fully open position and when the rolling door is placed in the fully closed position, thereby restraining the rolling door from moving within the guide tracks until the restraining mechanism is released.

5. The vehicle topper of claim 1 wherein the rolling door is moved between the fully open and the fully closed positions using an electric motor-driven mechanism.

6. The vehicle topper of claim 1 wherein the rolling door further includes a manual actuating means coupled to the leading edge of the rolling door, the actuating means for applying manual force to the rolling door to move it between the fully closed position and the fully open position.

7. The vehicle topper of claim 1 wherein the floor is capable of supporting factory load requirements specified for the vehicle bed.

8. The vehicle topper of claim 1 wherein the floor is extended vertically up the back end of the rolling door frame to protect the guide tracks and the rolling door from shifting loads.

9. The vehicle topper of claim 1 wherein the rolling door frame is made of an extruded material.

10. The vehicle topper of claim 1 wherein the rolling door frame is made of extruded aluminum.

11. The vehicle topper of claim 1 wherein the guiding means are bearings.

12. The vehicle topper of claim 1 wherein the cargo bed forms a cargo box with lateral walls extending vertically from each side of the vehicle bed and an end wall extending vertically from an end of the vehicle bed, the vehicle topper further comprising:
    an outer frame having two sides, each side coupled to one of the sides of the rolling door frame, and having an end coupled between the two sides of the outer frame and to the back end of the rolling door frame,
    wherein each of the two sides of the outer frame are capable of being supported by one of the lateral walls of the vehicle and the end of the outer frame is capable of being supported by the end wall of the cargo box.

13. The vehicle topper of claim 12 wherein each side and the end of the outer frame is coupled to one of the lateral walls using tie down elements of the vehicle.

14. The vehicle topper of claim 1 further comprising an outer frame having two sides, each side coupled to one of the sides of the rolling door frame, and having an end coupled between the two sides of the outer frame and to the back end of the rolling door frame, and wherein the vehicle bed has no vertical walls and the outer frame sides and end are extended to and coupled with the vehicle bed.

15. The vehicle topper of claim 1 wherein the rolling door is segmented to allow the rolling door to flexibly move through the guide tracks.

16. A vehicle topper that creates an enclosed compartment when coupled with a vehicle cargo bed, the vehicle topper capable of providing convenient and open access to the vehicle bed, the vehicle topper comprising:
    a rolling door frame, the rolling door frame having a base supporting two sides, a front end and a back end, each of the two sides of the rolling door frame supporting parallel guide tracks, each of the guide tracks being continuous between a starting point and an ending point;
    a floor covering at least an area defined by the base of the rolling door frame, the floor being supported by the base and able to form a sub-floor space between the floor and the vehicle bed when the vehicle topper is coupled to a vehicle cargo box, and wherein a portion of each of the two guide tracks runs under the floor and through the sub-floor space;
    a rolling door having two side edges, a leading edge and a trailing edge, each of the two side edges having a plurality of bearings attached thereto between the leading edge and the side edge, the bearings attached to each side edge of the rolling door being disposed in a different one of the guide tracks, the bearings for slideably supporting the door within the guide tracks between a completely closed position and a completely open position; and an electric motor and drive mechanism in communication with the rolling door for actuating the rolling door between the fully open position and the fully closed.

17. The vehicle topper of claim 16 further comprising:

a mechanism that temporarily disengages the drive mechanism from the rolling door to permit manual actuation of the rolling door; and a manual actuating means coupled to the leading edge of the rolling door by which the rolling door can be moved manually between the fully closed position and the fully open position.

18. The vehicle topper of claim 17 wherein the actuating means is a handlebar including a telescoping handle.

19. A vehicle topper that creates an enclosed compartment when coupled with a vehicle cargo box, the vehicle cargo box including a vehicle bed, the vehicle topper capable of providing convenient open access to the vehicle bed, the vehicle topper comprising:

a rolling door frame, the rolling door frame having a base supporting two sides, a front end and a back end, each of the two sides of the rolling door frame forming parallel vertical planes, each of the two sides of the frame supporting within its parallel vertical plane a guide track, each of the guide tracks being continuous between a starting point and an ending point;

a floor covering at least an area defined by the base of the rolling door frame, the floor being supported by the base and able to form a sub-floor space between the floor and the vehicle bed when the vehicle topper is coupled to a vehicle cargo box, and wherein a portion of each of the two guide tracks runs under the floor and through the sub-floor space;

a rolling door having two side edges, a leading edge and a trailing edge, each of the two side edges having a plurality of guiding means attached thereto between the leading edge and the side edge, the guiding means attached to each side edge of the rolling door being disposed in a different one of the guide tracks, the guiding means for slideably supporting the door within the guide tracks between a completely closed position, where the leading edge of the rolling door is located at the starting point of each of the guide tracks, and a completely open position, where the trailing edge of the rolling door is at the ending point of each of the guide tracks; and a diverter that permits the rolling door to bypass the fully closed position and travel 360 degrees around the guide tracks.

20. The vehicle topper of claim 1 wherein the cargo bed forms a cargo box with lateral walls extending vertically from each side of the vehicle bed and an end wall extending vertically from an end of the vehicle bed, the vehicle topper further comprising:

an outer frame having two sides, each side coupled to one of the sides of the rolling door frame, and having an end coupled between the two sides of the outer frame and the back end of the rolling door frame, wherein each of the two sides of the outer frame are capable of being supported by one of the lateral walls of the vehicle and the end of the outer frame is capable of being supported by the end wall of the cargo box.

\* \* \* \* \*